Dec. 12, 1944.     E. M. GREER     2,364,709
PORTABLE HYDRAULIC TEST STAND FOR AIRCRAFT
Filed June 24, 1943     3 Sheets-Sheet 3
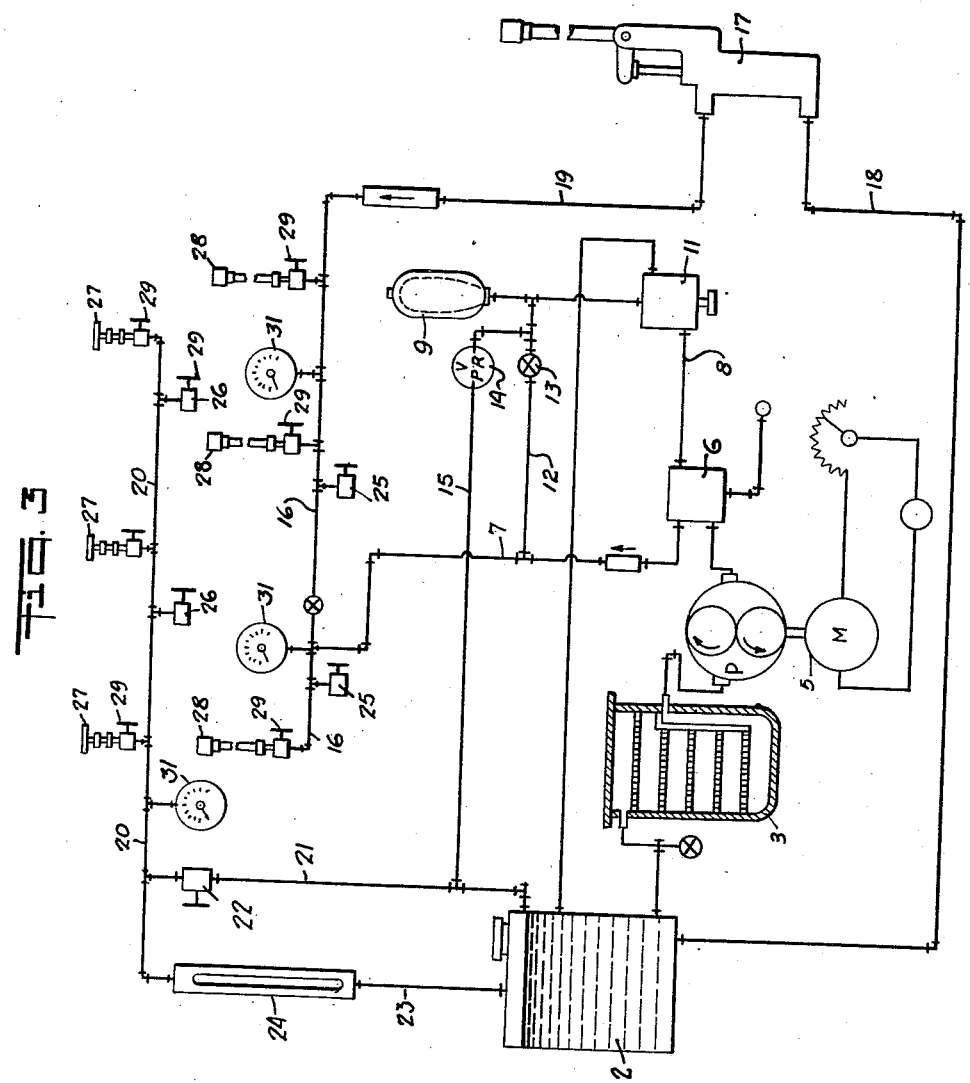
INVENTOR.
*Edward M. Greer*
BY
*Howard T. Jeandron*
ATTORNEY Patented Dec. 12, 1944

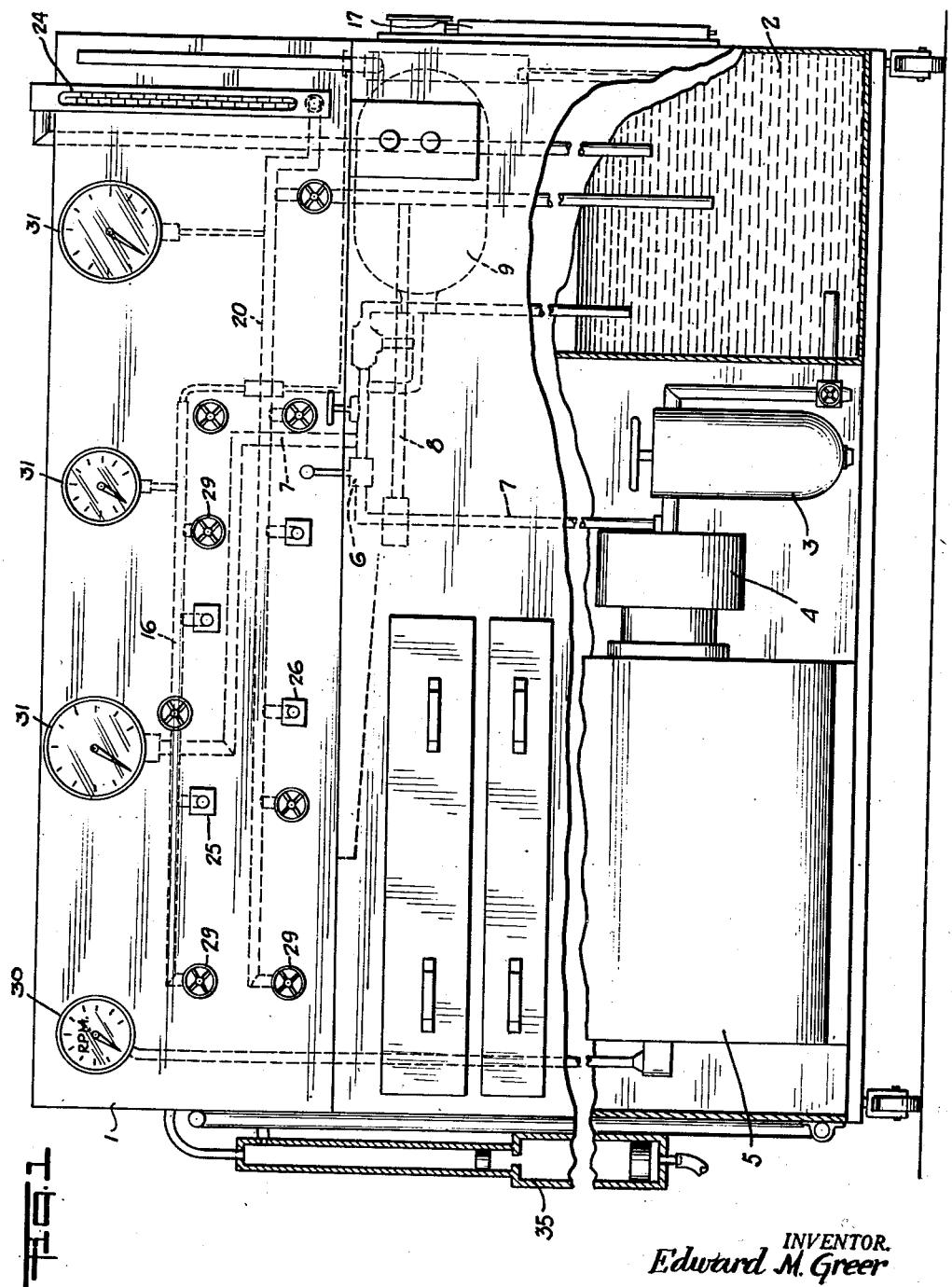

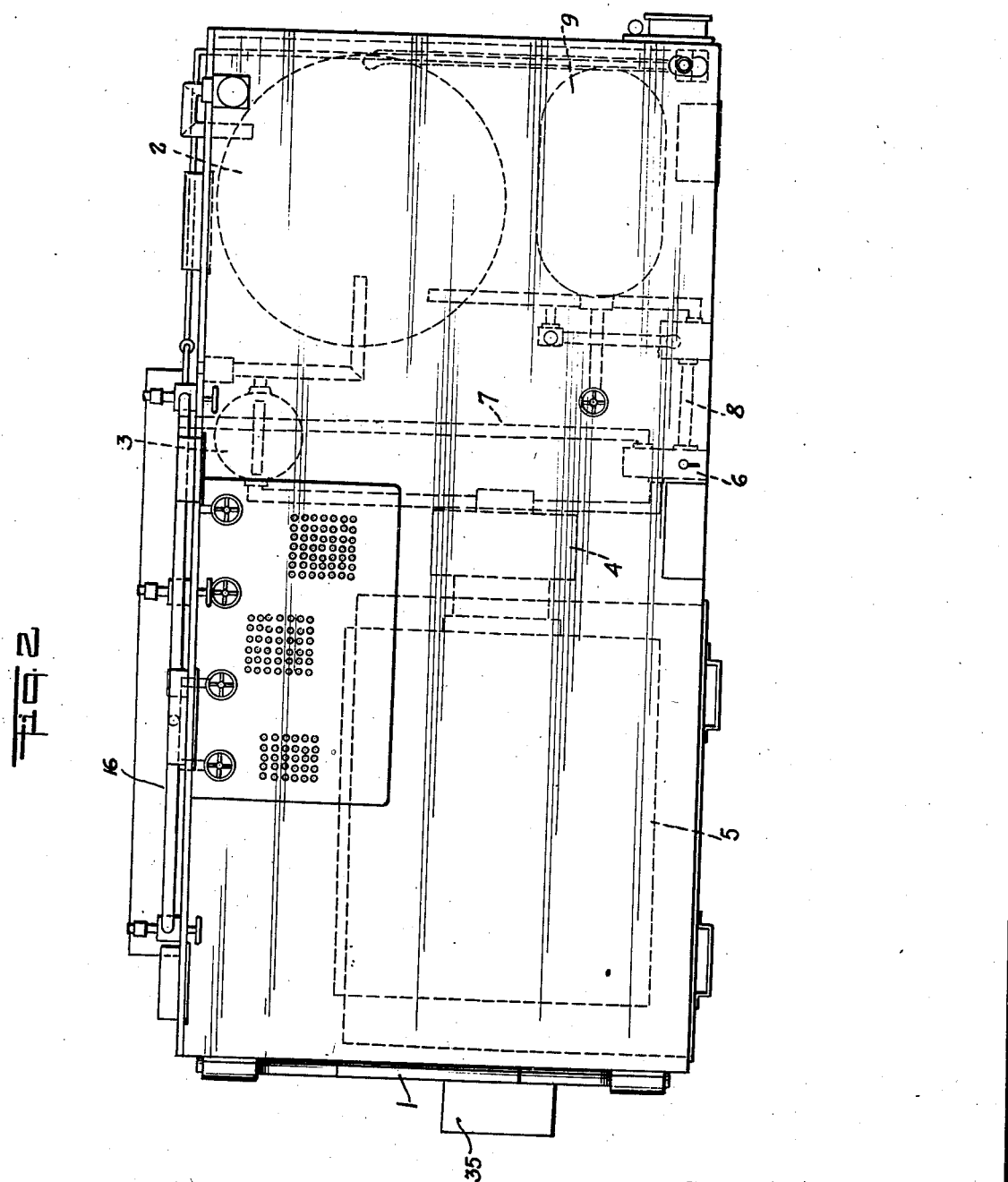

2,364,709

UNITED STATES PATENT OFFICE 2,364,709

PORTABLE HYDRAULIC TEST STAND FOR AIRCRAFT

Edward M. Greer, West Hempstead, Long Island, N. Y.

Application June 24, 1943, Serial No. 492,084

6 Claims. (Cl. 73—168)

The present invention pertains to portable test stands for aircraft and more particularly for testing the hydraulic appliances thereon. Heretofore, it has been the usual practice to remove from the plane the parts to be tested, to a stationary installation. It is the object of the present invention to provide a transportable unit which can be easily moved around the airfield or the like, and which is so comprehensively equipped that all tests required to verify the condition of the hydraulic equipment aboard the aircraft can be speedily carried out, either while affixed to the aircraft or after removal from the aircraft.

To that end, the test stand is mounted on wheels, with pressure and return outlets projecting from the stand proper. Mounted within the frame the stand includes three different potential sources of fluid power; to wit, a motor-driven high pressure pump, a hand pump for supplying smaller volumetric fluid under pressure, and a hydraulic accumulator for supplying fluid under progressively decreasing pressure. A valve is connected to all three sources to permit selection at will.

The test stand further includes within said frame, conduits and valve means operable from the outside which afford communication between a plurality of pressure outlets of various sizes and the desired potential source of fluid pressure.

Further valve means permit the connection of a plurality of return outlets with either a free return line or a flow meter and an auxiliary return line.

Further features will become apparent from the following description of an embodiment of the present invention, illustrated in the accompanying drawings:

Fig. 1 is a front view of a test stand according to the present invention;

Fig. 2 is a top view of the test stand shown in Fig. 1 and

Fig. 3 is a diagrammatic view of the operating system incorporated in the test stand, according to Figs. 1 and 2.

In Figs. 1 and 2, frame 1 of the test stand supports a reservoir 2 which holds the hydraulic liquid. Also supported within the stand is a strainer 3 comprised of a housing with a plurality of strainer inserts and having an inlet and outlet port, the fluid from the reservoir passing through the plurality of strainers. A variable volume pump 4, driven by a motor 5 said motor having a rheostat control so that the R. P. M. may be increased or decreased to vary the volume delivery of the pump 4. The fluid delivered by pump 4 passes a three-way selector valve 6 which selects either high pressure flow into line 7 leading to a pressure manifold 16, or medium pressure flow into line 8 leading to a hydraulic accumulator 9, said selector valve having no flow in its neutral position. Said accumulator 9 comprised of a metal bottle with a rubber bag insert and an air valve on one end of said bottle to charge the bag with air under pressure and a fluid port on the other end to supply fluid under pressure against the bag. An unloader valve 11 is interposed in line 8 to by-pass fluid to a return line and back to reservoir 2 when accumulator 9 has reached its fluid pressure capacity.

Accumulator 9 is connected by line 12 to line 7 with the interposition of a shut-off valve 13, line 12 communicates through a relief valve 14 and a return line 15 with a reservoir 2 so that fluid under excessive pressure—delivered by pump 4 or accumulator 9 or by both—can be by-passed.

A hand pump 17 communicates through line 18 with reservoir 2 and through line 19 with pressure manifold 16.

A return manifold 20 communicates through line 21 with reservoir 2, or, if this communication is obstructed by shut-off valve 22, the discharge of fluid proceeds through line 23 which includes a rotameter type flow meter 24.

From both manifolds 16 or 20, there branch off a plurality of pressure and return outlets, five of which are shown in the drawings. Pressure outlets 25 and return outlets 26 are provided for testing appliances on the test stand.

Outlets 27 and 28 are provided for the testing of appliances on an airplane by means of a hose connection between the plane and the test stand. In order to facilitate and accelerate the mounting of such hose connections, each of the three outlets 27 and 28, respectively, is installed in a plurality of sizes and each outlet comprises a self-sealing coupling of one of the plurality of standard sizes used for hydraulic conduits on aircraft.

Each individual outlet is controlled by a shut-off valve 29, so that the number of outlets to which fluid may be delivered from any of the sources of fluid pressure, or a combination thereof, and the number of outlets through which fluid may be returned are always at the discretion of the operator.

A tachometer 30 connected directly to the motor to indicate the R. P. M. and several gauges 31 permit a constant control of the operation of the test stand at the desired pressure for each test performed.

The pressure manifold 16 is so connected that it receives the fluid flow from the power pump 4 or from the hand pump 17 as desired. A hand shut-off valve 29 is provided so that one half of the manifold may be shut off from the other half; thus, one half of the manifold may be supplied from the power pump, while the other half is supplied by the hand pump. The three gauges 31 are so connected that they may be isolated from each other and any one may be selected. These gauges are chosen for their capacity which is 500 pounds per square inch, 3,000 pounds per square inch and 6,000 pounds per square inch.

Inasmuch as new requirements demand that new or repaired hydraulic systems must be filtered and filled from an external power unit to assure clean oil in the system, a very large efficient filter is provided in this unit to accommodate this need. By using the oil in the test stand reservoir and pumping it through this filter and watching the return flow through the glass flowmeter, the airplane hydraulic system can be filled and scavenged of all dirt and foreign matter. Continuous operation will drive all the air out of the airplane system which can be checked by watching the flow through the flowmeter.

An additional feature of the unit is that an air booster pump 35 capable of boosting air pressure up to 1,000 pounds p. s. i. is permanently attached to the frame 1 of the stand so that airplane shock struts and accumulator can be pressure charged.

This booster pump is comprised of two cylinders connected to each other, one being larger in diameter. Both cylinders having a sliding piston within. The lower cylinder is connected by a hose to an air compressor and a line is also connected to the top of the small cylinder. In operation, the small cylinder if filled by the compressor forcing both pistons to the bottom of their stroke and filling the small cylinder with air to be compressed further. The lower cylinder is then supplied by the compressor forcing the pistons upward, since the lower cylinder is larger in diameter it will exert extreme force on the smaller piston causing a boost in pressure to the air in the small cylinder. The outlet of the small cylinder has a pressure hose which may be connected to a device to be charged with high pressure air.

The foregoing description is not intended to limit the present invention, which extends to any changes and equivalents within the scope of the appended claims.

What is claimed is:

1. A transportable test stand for testing hydraulic appliances on aircraft which comprises a transportable frame, a reservoir for fluid under normal pressure mounted therein, three devices for supplying fluid under increased pressure; to wit, a high pressure variable flow pump associated with a motor, a low volume pressure pump adapted to be operated manually, and a hydraulic accumulator adapted to supply fluid under progressively decreasing pressure, conduits to feed fluid from said reservoir to said two first-mentioned devices, means to feed fluid under pressure from said first-mentioned to said third mentioned device, a plurality of pressure outlets in one of the outside walls of said frame, each including a self-sealing coupling, a plurality of return outlets in one of the outside walls of said frame, each including a self-sealing coupling, a free return line extending between all said return outlets and said reservoir, another return line extending between the same outlets and the same reservoir but including a flow meter, means to direct the return flow of fluid alternatingly through the first-mentioned and the second mentioned return line, and means, operable from the outside, to connect any desired number of pressure outlets to any desired number of devices.

2. A transportable test stand according to claim 1 in which the delivery lines of said storage device and of said pump are connected to said reservoir by a conduit controlled by a relief valve.

3. A transportable test stand according to claim 1 in which said first mentioned means include a three position selector valve adapted alternatively to connect the delivery line of said pump to the supply line of said storage device, to the supply line of said pressure outlets and to obstruct said delivery line, and an unloader valve interposed in the said supply line of said storage device.

4. A transportable test stand according to claim 1 in which each of said pressure and return outlets is comprised of a plurality of couplings, each said coupling having a diameter corresponding to one of the standard sizes used on aircraft for hydraulic connections.

5. A transportable test stand which comprises a reservoir, a motor driven fluid pump, a hand operated fluid pump, an accumulator for storing fluid pressure, an unloader valve for charging the accumulator to a desired pressure, a pressure manifold having a central valve to cut off one section from the other to maintain different pressure in each section, an exhaust manifold, inlet and exhaust connections associated with said manifolds, means to charge the pressure manifold with a predetermined pressure, means to charge one half of the manifold with one predetermined high pressure while charging the other half with a predetermined lower pressure, and means to use one half of the manifold in conjunction with the hand pump to supply any predetermined low pressure while using the other half of the pressure manifold for a different pressure.

6. A transportable test stand which comprises a reservoir, a motor driven fluid pump, a hand operated fluid pump, an accumulator for storing fluid pressure, an unloader valve for charging the accumulator to a desired pressure, a pressure manifold having a central valve to cut off one section from the other to maintain different pressure in each section, an exhaust manifold, inlet and exhaust connections associated with said manifolds, means to charge the pressure manifold with a predetermined pressure, means to charge one half of the pressure manifold directly from the unloader valve while charging the other half directly from the accumulator, and means to charge one half of the pressure manifold through the unloader valve and accumulator while charging the other half directly from the hand pump.

EDWARD M. GREER.